Aug. 4, 1936.　　　　E. G. HILL　　　　2,049,736
CLUTCH OPERATING DEVICE FOR MOTOR VEHICLES
Filed May 13, 1931　　　3 Sheets-Sheet 1

Inventor
EDWARD G. HILL
C. L. Parker, Jr.
Attorney

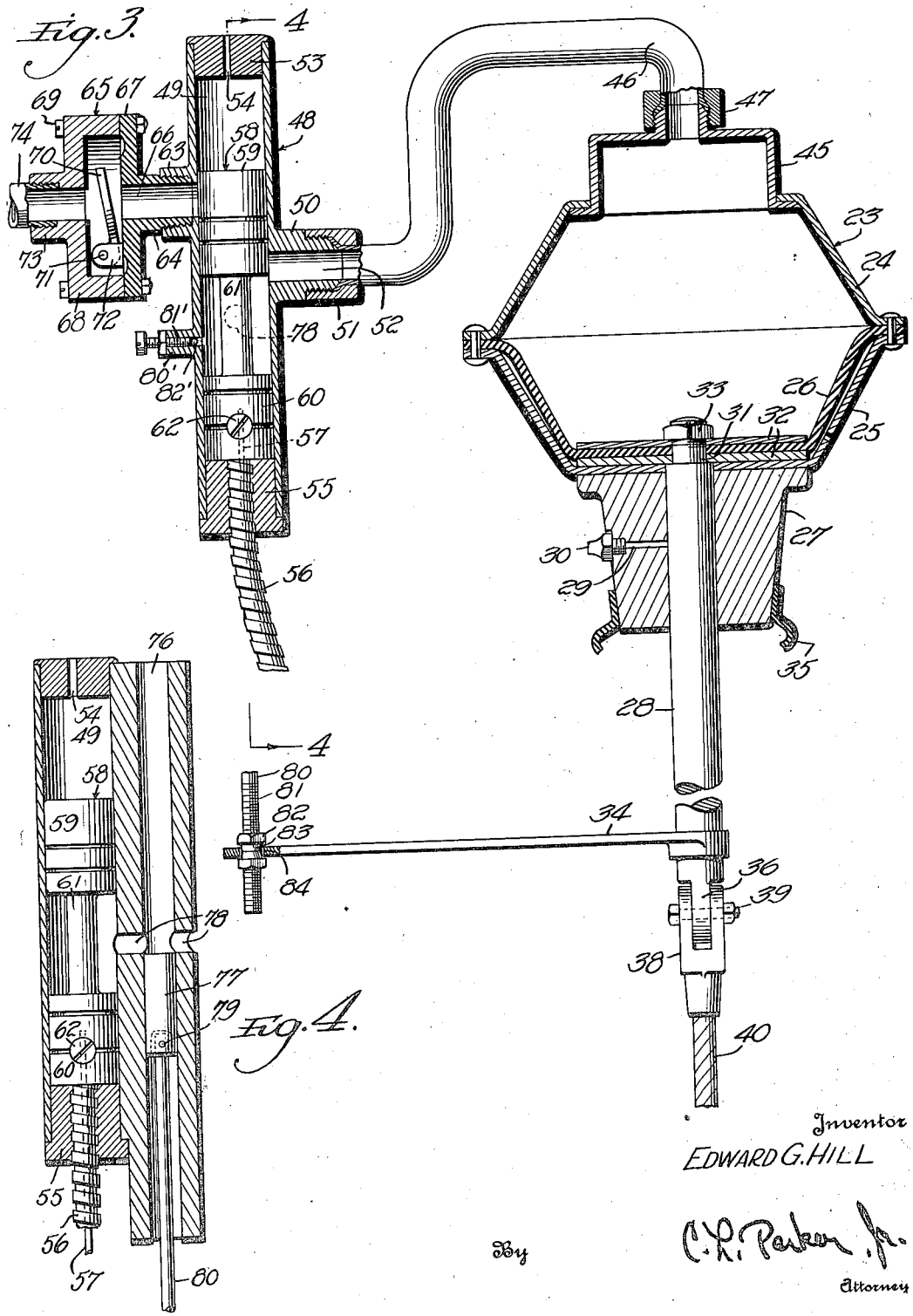

Aug. 4, 1936.  E. G. HILL  2,049,736
CLUTCH OPERATING DEVICE FOR MOTOR VEHICLES
Filed May 13, 1931  3 Sheets-Sheet 3
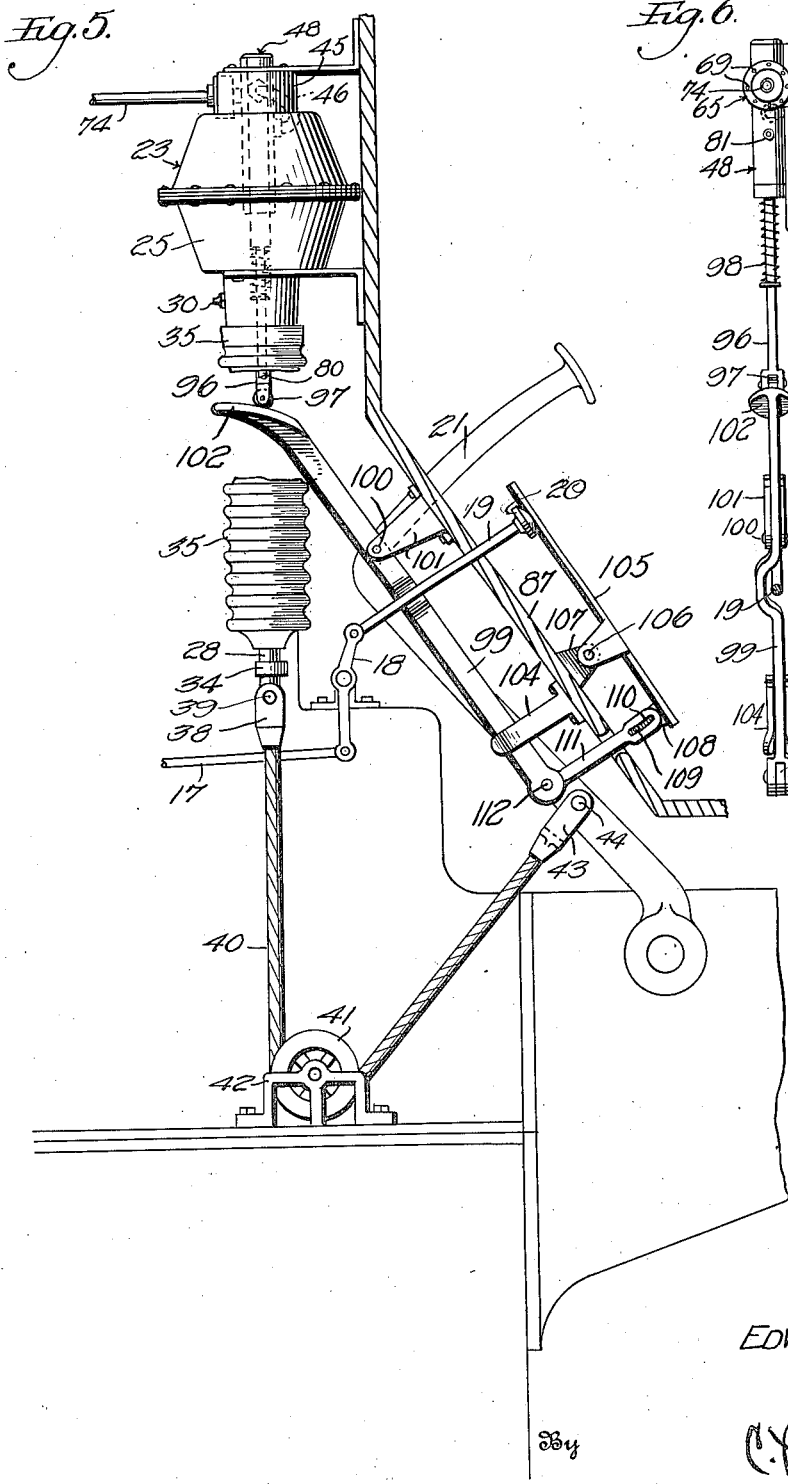
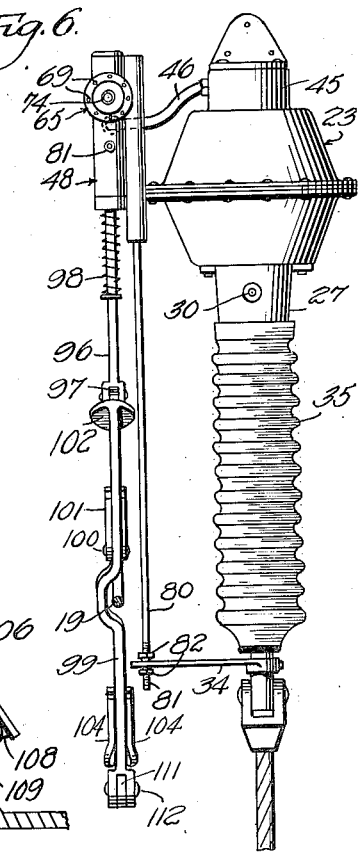
Inventor
EDWARD G. HILL
By C. L. Parker Jr.
Attorney Patented Aug. 4, 1936

2,049,736

UNITED STATES PATENT OFFICE 2,049,736

CLUTCH OPERATING DEVICE FOR MOTOR VEHICLES

Edward G. Hill, Richmond, Va., assignor to Hill Engineering Corporation, Richmond, Va., a corporation of Virginia Application May 13, 1931, Serial No. 537,155

25 Claims. (Cl. 192—.01)

This invention relates to clutch operating devices for motor vehicles.

In my copending applications Serial Nos. 480,598, filed September 8, 1930, and 487,319, filed October 8, 1930, I have disclosed differential pressure mechanisms adapted for use in connection with the control of a motor vehicle, and particularly for operating the clutch pedal thereof. In the prior constructions referred to, the vacuum of the intake manifold is utilized as the source of differential pressure and the pressure operated device is controlled by suitable valve mechanism operated mainly from a manually controlled element in the form of a button located at the top of the gearshift lever, whereby depression of the button effects disengagement of the clutch for the purpose of permitting the gears to be shifted and for providing "free wheeling" when desired.

As is well known, it is necessary that the clutch pedal of a motor vehicle be moved slowly past the point where clutch engagement takes place when the gearshift is in low gear and the vehicle is at rest, in order to prevent the clutch from "grabbing". Such slow movement of the clutch pedal to operative position is not essential when the car is under way, and accordingly the clutch pedal may be permitted to return to operative position relatively rapidly when the gearshift is in second and high gears.

In the prior constructions referred to, the manually operable button is adapted to be released in such a way that the control valve mechanism of the differential pressure device will permit the clutch pedal to return rapidly to a point just prior to engaging position, and then slowly past engaging position to prevent the clutch from "grabbing". When the vehicle is under way, the control button may be released relatively suddenly to permit fairly rapid engagement of the clutch elements, thus permitting the controlling of the vehicle to simulate standard practice and to permit the various operations to take place in a minimum length of time.

The present invention has for one of its objects the provision of an improved control valve mechanism which greatly facilitates the checking of the movement of the clutch pedal just before it reaches engaging position.

A further object is to provide a valve mechanism wherein not only relatively slow movement of the clutch elements may be obtained at the point of engagement of these elements, but wherein movement of the elements may be completely stopped just prior to their point of engagement whereby the movement of the accelerator pedal of the vehicle may be more accurately synchronized with the engagement of the clutch elements to permit the vehicle to start smoothly in low gear.

A further object is to provide a control valve mechanism which is operable to permit air to flow rapidly into the differential pressure device to tend to provide pressure equalization under which conditions the clutch elements will move rapidly toward engaging position, the valve mechanism being of such character that communication between the differential pressure device and the atmosphere may be completely cut off during the movement of the valve mechanism under manual control, whereby the elements of the clutch may be held stationary just before they are ready to be engaged to permit the operator to more accurately operate the accelerator pedal during engagement of the elements of the clutch.

A further object is to provide novel control means for the valve mechanism which permits the elimination of a separate hand operated button and materially facilitates the operation of the vehicle.

A further object is to provide a control mechanism of the character referred to which readily may be operated by the same foot with which the operator depresses the throttle pedal, without the necessity of having to remove the foot from operative position.

A further object is to provide a control device for a power operated clutch control mechanism which permits the operator of the vehicle to control both the accelerator pedal and the clutch with a single foot remaining in the same operative position to facilitate the shifting of the gears without the necessity of having to depress the clutch pedal, and to permit "free wheeling" to take place wholly under the will of the operator.

A further object is to provide an operating element controllable by the operator for actuating the accelerator pedal and clutch and which is adapted to assume a neutral position and to accomplish different results in such position depending upon the direction from which it is moved to neutral position whereby the releasing of the accelerator may be accomplished completely without affecting the clutch mechanism, and whereby the control element may be moved to neutral position from its clutch operating position without completely moving the clutch elements to operative position and without depressing the accelerator pedal, further movement of the control element being adapted to depress the accelerator pedal simultaneously with the engaging of the clutch elements.

Other objects and advantages of the invention will become apparent during the course of the following description.

In the drawings I have shown two embodiments of the invention. In this showing,

Figure 3 is an enlarged sectional view of the valve mechanism and the differential pressure device, parts being shown in elevation.

Figure 4 is a section on line 4—4 of Figure 3,

Figure 5 is a side elevation of a modified form of the device, and,

Figure 6 is a front elevation of the same.

Figure 1:
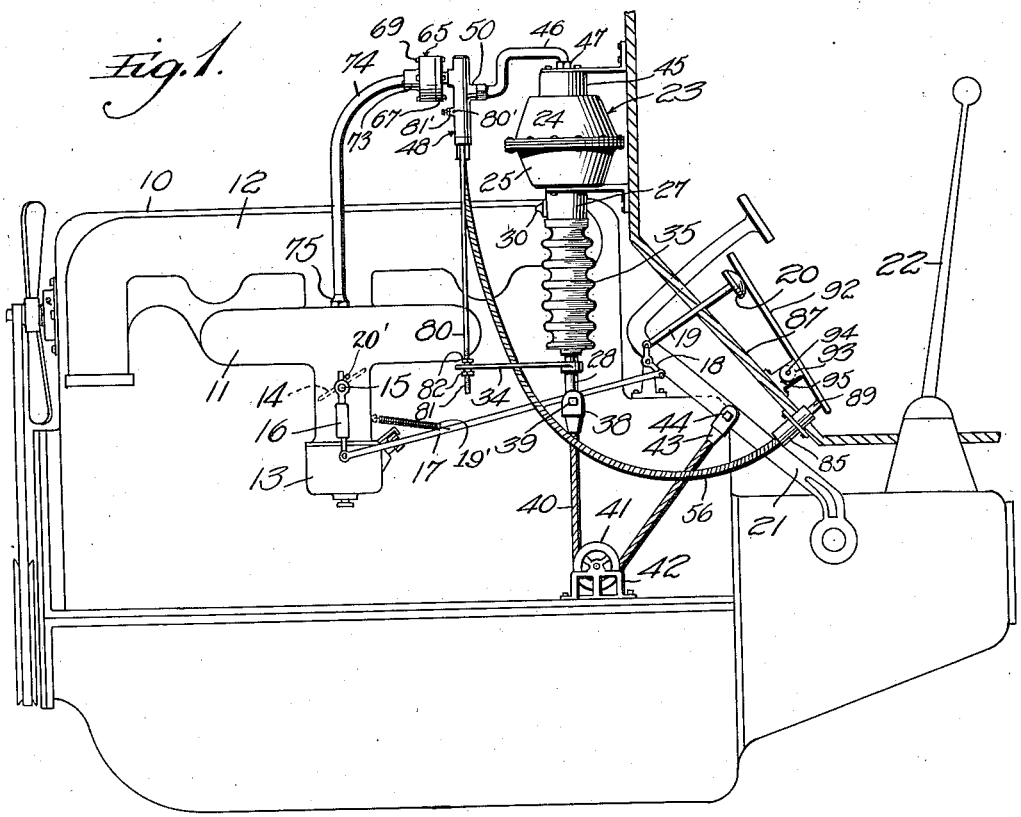
Figure 1 is a side elevation of a motor vehicle engine and associated elements showing the invention applied.

Referring to Figures 1 to 4, inclusive, the numeral 10 designates a motor vehicle engine having an intake manifold 11 and an exhaust manifold 12. A carbureter 13 supplies fuel to the intake manifold and is controlled by the usual throttle 14 mounted upon a shaft 15. A depending arm 16, carried by the throttle shaft is pivotally connected at its lower end to the forward end of a rod 17. This rod is pivotally connected at its rear end to one end of a bell crank lever 18, and the other end of this lever is connected to a pedal rod 19 having an accelerator pedal 20 secured to its upper end. A spring 19' urges the throttle toward closed or idling position, and a stop 20' limits the movement of the throttle in accordance with conventional practice.

The engine of the vehicle is provided with the usual controls including a clutch (not shown) operable by a pedal 21, and is further provided with a gear shift lever 22 to shift the gears in the usual manner. The elements just described are conventional parts of a motor vehicle and form no part of the present invention.

Referring to Figures 1 and 3, the numeral 23 designates a differential fluid pressure device as a whole illustrated in the present instance as comprising upper and lower frustro-conical sections 24 and 25 between the adjacent edges of which is secured the edge portion of a diaphragm 26. A bearing 27 is carried by the casing section 25 to slidably support a shaft 28, and lubricant may be supplied to this shaft by means of a passage 29, preferably having a pressure lubricating fitting 30 connected therewith. The upper end of the shaft 28 is reduced as at 31 and carries disks 32 arranged on opposite sides of the central portion of the diaphragm, and a nut 33 clamps these elements to the end of the shaft.

The shaft 28 projects a substantial distance downwardly below the bearing 27, and near its lower end, the shaft is provided with a laterally extending arm 34 for a purpose to be described. Between the arm 34 and the bearing 27, the shaft is covered by a flexible bellows 35 to protect the bearing 27 against the entrance of dust or other foreign material thereinto. The lower end of the shaft 28 is reduced as at 36 for reception between the arms of a connector 38, these elements being connected to each other by a bolt 39. The connector 38 is secured to one end of a flexible cable 40 which passes around a pulley 41 supported in a bracket 42. The other end of the cable 40 is provided with a connector 43 pivotally connected as at 44 to the clutch pedal 21, as clearly shown in Figure 1.

The top of the casing section 24 of the fluid pressure device is provided with a cylindrical head 45 to which a conduit 46 is connected by means of a union 47. A valve housing indicated as a whole by the numeral 48 is provided with suitable valve mechanism to be referred to for establishing a pressure differential in the device 23, through the pipe 46, to lift the diaphragm 26 and shaft 28. As shown, the valve housing 48 is provided with a cylindrical chamber 49 from which a threaded boss 50 extends, and the other end of the pipe 46 is connected to this boss by a union 51. The pipe 46 communicates with the interior of the chamber 49 through a passage 52 extending through the boss 50.

For convenience in machining, the chamber 49 is preferably open at both ends, and the upper end is provided with a plug 53 having a vent opening 54 therein. The lower end of the chamber 49 is closed by a plug 55 through which extends a flexible housing 56 carrying a flexible steel wire 57 slidable therein. A valve 58 is slidable in the chamber 49 and includes upper and lower heads 59 and 60 connected by a reduced shank 61. The lower valve head 60 is drilled axially in its lower end to receive the end of the wire 57, and this wire is secured to the valve head by a screw 62. It will be apparent that the valve is in its lowermost position in Figure 3, the plug 55 limiting the downward movement of the valve. In such position, the passage 52 communicates with the space in the chamber 49 surrounding the valve shank 61.

The valve housing 48 is provided opposite the boss 50 with a second boss 63 arranged thereabove. This boss is internally threaded to receive a shank 64 of a casing 65. The shank 64 is provided with a passage 66 communicating with the interior of the chamber 49 and with the interior of the casing 65. The shank 64 is preferably formed integral with a plate 67 forming one part of the casing 65, and the other portion 68 of this casing is secured to the plate 67 by bolts or the like 69. A flap valve 70 is arranged in the casing 65 and is pivotally connected as at 71 to ears 72 carried by the plate 67.

The casing section 68 is provided with an internally threaded boss 73 receiving one end of a vacuum conduit 74, and the opposite end of this conduit is connected by a suitable union 75 to the intake manifold of the engine 10 (see Figure 1). It will be apparent that the intake suction provides a source of differential pressure by means of which the diaphragm 26 is operated to transmit movement to the clutch pedal.

The valve housing 48 is provided to one side of the chamber 49 and parallel thereto with a cylindrical valve guide 76 in which is slidably mounted the valve 77. The valve casing 48 is drilled to provide a passage 78 leading from the atmosphere into the valve chamber 49, and the valve 77 is normally arranged just below the passage 78 as shown in Figure 4. The lower end of the valve 77 is loosely connected as at 79 to the upper end of a depending rod 80. This rod is threaded at its lower end as at 81 to receive nuts 82 having central reduced portions 83 adapted to clamp against each other whereby each nut 82 acts as a lock nut for the other. The reduced portions of the nuts 82 are received in an opening 84 formed in the free end of the arm 34. In order that free movement may take place, the reduced portions of the nuts 83 preferably fit loosely within the opening 84.

A small boss 80' extends from one side of the valve housing 48 and is provided with a valve 81' threaded therein and controlling communication between the interior of the chamber 48 and the atmosphere through a small bleed opening 82'. It will be noted that the bleed opening 82' is located slightly below the passage 78, as indicated in Figure 3.

Figure 2:
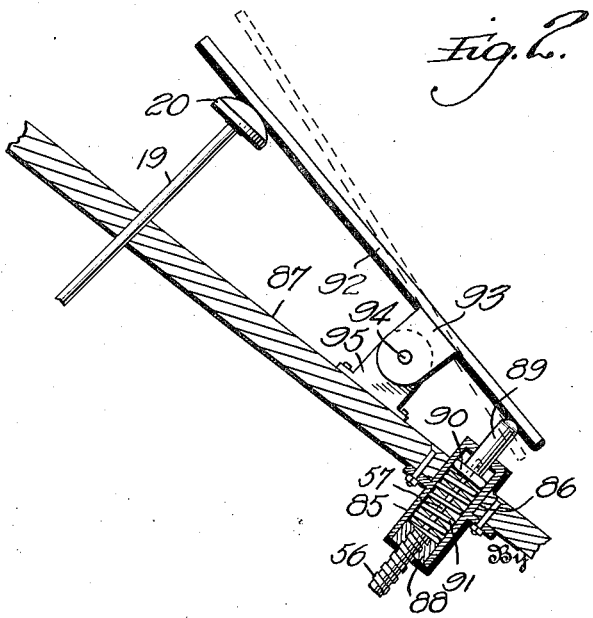
Figure 2 is a detail sectional view showing the control pedal, parts being shown in elevation.

Referring to Figure 2 the numeral 85 designates a small cylinder having its upper end extending through an opening 86 formed in the floor board 87 through which the shank of the accelerator pedal extends. The cylinder 85 is arranged below and rearwardly of the accelerator pedal for a purpose to be described. A plug 88 closes the lower end of the cylinder 85 and receives the end of the flexible housing 56 in which the operating wire 57 is slidable. This wire is connected at its end to an operating button 89 having an annular flange 90 at its lower end engageable with the upper end of the cylinder 85 to limit its upward movement. A compression spring 91 is arranged in the cylinder 85 and the ends of the spring respectively engage the plug 88 and flange 90 to normally urge the button 89, wire 57 and valve 58 to normal positions.

An operating pedal 92 is provided for operating the accelerator 20 and button 89. The pedal is provided with ears 93 on its under side pivotally connected as at 94 to the ears of a bracket 95 secured against the floor board 87. The operating pedal 92 normally occupies the inoperative position shown in Figure 2, and which position will be described in detail later.

A somewhat modified form of the invention is shown in Figures 5 and 6 of the drawings. In the modified form the fluid pressure device and its connection to the clutch pedal and the control valve mechanism of the fluid pressure device are identical with the form previously described and need not be referred to in detail. The only difference between these elements lies in the elimination of the flexible wire 57 and the substitution therefor of a depending shank 96 connected at its upper end to the valve 58. The lower end of the shank 96 is provided with a roller 97, and a light compression spring 98 tends to move the stem 96 downwardly.

A lever 9 is pivoted intermediate its ends as at 100 to a bracket 101 carried by the floor board 87. The upper end of the lever 99 is provided with a laterally extending curved cam 102 adapted to engage the roller 97. A pair of leaf springs 104 are secured against the bottom of the floor board and frictionally engage opposite sides of the lever 99 to slightly resist movement thereof. The friction of the springs 104, however, is sufficient to overcome the tension of the light spring 98.

An operating pedal 105 similar to the pedal 92 is provided for operating the modified form of the device. This pedal is pivotally connected as at 106 to a bracket 107, and the upper forward end of the pedal engages against the accelerator pedal to transmit movement thereto. The lower rear end of the pedal 105 is provided with an arm 108 carrying a pin 109 engageable in a slot 110 formed in a shank 111. This shank is pivotally connected as at 112 to the lower end of the lever 99. It will be apparent that depression of the upper end of the pedal 105 will transmit no movement to the lever 99 until the pin 109 reaches the upper end of the slot 110. Similarly, after the pedal 105 has been depressed in the manner referred to and is moved back toward normal position, it will transmit no movement to the lever 99 until the pin 109 has reached the lower end of the slot 110, and accordingly it will be necessary to swing the pedal 105 back beyond normal position, at which point the accelerator pedal is completely released, before movement will be transmitted to the lever 99.

The present invention is highly successful in simplifying the control of a motor vehicle. The depression of the control pedal downwardly at its forward end operates the accelerator, while rearward tilting movement of the control pedal releases the clutch to permit the gears to be shifted or to permit the vehicle to "free wheel". It is wholly undesirable that "free wheeling" should take place whenever the accelerator pedal is released for several reasons. For example, in heavy traffic, it is desirable to employ the engine of the vehicle as a brake to permit the speed of the vehicle to be decelerated without constant use of the brake, and such operation cannot take place if the clutch is disengaged whenever the accelerator pedal is released. Moreover, on slippery highways, it is desirable to have the engine connected to the driving wheels of a vehicle whenever the brakes are employed, until the vehicle speed becomes relatively slow, in order that skidding may be eliminated. Such action also cannot take place if the clutch is disengaged at each releasing of the accelerator pedal.

On the other hand, when the clutch has been disengaged and the gears shifted, and it is desired to release the clutch to accelerate the vehicle speed, it is desirable that acceleration of the engine take place just prior to the engagement of the clutch to prevent stalling of the engine. Accordingly, the present invention contemplates that movement of the control pedal to normal position after the accelerator pedal has been depressed will cause no operations of the accelerator or clutch to take place. In other words such movement of the control pedal will bring the latter to a normal position in which the accelerator pedal will be completely released, and no movement will be transmitted to the control valve for the differential pressure device. On the other hand, the construction is such that when the control pedal is moved toward normal position after the clutch has been disengaged, complete engagement of the clutch will not take place until acceleration of the vehicle engine has started. Moreover, the operation of the device is such that when the control pedal reaches normal position from its clutch operating position, and is left in such position for a reasonable length of time, complete engagement of the clutch is prevented from taking place. Thus it will be apparent that the operation of the control pedal accomplishes a highly efficient operation of the vehicle, and the control pedal performs different functions in its normal position depending upon the direction from which it is moved to such position.

With the above ideas in mind, the operation of the apparatus will be described in detail, reference being had first to the form of the invention shown in Figures 1 to 4 inclusive. The depression of the accelerator pedal is accomplished by operating the control pedal 92. The accelerator pedal and its connections operate in accordance with standard practice and need not be referred to in detail.

When it is desired to disengage the clutch, as when the gears are to be shifted, the control pedal may be operated in what may be termed its reverse direction, that is, it may be swung to the dotted line position shown in Figure 2 to depress the button 89 beyond its solid line position shown in Figure 2. In this connection, attention is particularly invited to the fact that when the control pedal is in normal position after having returned to such position from a throttle operating position, the button 89 is partly depressed. This depression of the button, however, does not transmit any movement to the control valve 58 for the reason that some play is provided between the wire 57 and the interior of the flexible guide 56, and it is necessary to depress the button to a substantial extent against the tension of the spring 91 before this play is taken up. On the other hand, the valve 58 is returned to normal or clutch engaged position as in Fig. 3 by the spring 91, and it is necessary to take up all of the play in the wire in the other direction before the valve will be returned to normal position, and accordingly it is necessary to completely release the button 89 by counter-clockwise rotation of pedal 92 from its full line position to permit the shoulder 90 to move into engagement with the upper end of the cylinder 85 before the valve will move to its lowermost position.

As previously stated, the clutch is released by reverse movement of the control pedal 92, which movement depresses the button 89, thus transmitting movement to the wire 57 to lift the valve 58. When this valve is moved to its uppermost position, the head 59 of the valve passes the passage 66, and communication thus will be afforded between the intake manifold and the upper chamber of the differential pressure device, around the valve shank 61. This action exhausts air from the upper chamber of the differential pressure device, thus causing the diaphragm 26 to move upwardly and to transmit such movement to the shaft 28. This movement in turn is transmitted to the flexible member 40, and thus the clutch pedal 21 will be moved to completely depressed position to release the clutch elements.

Assuming that the vehicle is at rest and the depression of the clutch pedal has been effected to permit the gear shift lever 22 to be shifted from neutral into low gear position, the clutch then may be engaged to permit the vehicle to be moved forwardly. Initial releasing position of the control pedal under such conditions takes place to a sufficient extent to place the upper edge of the lower valve head 60 at a point between the port 78 and the bleed opening 82', and with the valve in such position, the passage 66 will be closed by the upper head 59, and air will flow into the upper chamber of the differential pressure device through the ports 78, through the space surrounding the valve shank 61, and thence into the differential pressure device through the conduit 46. In this connection it will be noted that the auxiliary valve 77 normally (that is, when the clutch is engaged) occupies the position shown in Figure 4 with the ports 78 open, and when the shaft 28 moves upwardly to completely release the clutch elements, the valve 77 will move entirely past the ports 78. However, when the valve head 60 is moved to its initial releasing position between the port 78 and bleed opening 82', there will be a rush of air into the upper chamber of the differential pressure device, under which conditions the spring of the clutch will tend to move the parts back to normal position.

As the shaft 28 moves downwardly under the conditions referred to, such movement will be transmitted by the arm 34 to the shank 80 to move the valve 77 downwardly until it closes the ports 78. This action preferably takes place substantially at the point of initial engagement of the clutch elements, and the desired point may be adjusted by proper adjustment of the nuts 82. Thus it will be apparent that the rush of air into the upper differential pressure chamber will be cut off, and further movement of the clutch elements toward engaged position will be arrested. Under such conditions, the differential pressure device will be cut off both from the source of suction and the atmosphere and all of the parts will remain in their arrested position for a substantial length of time, depending upon the amount of leakage around the valves which has been found to be substantially negligible.

When the control pedal is moved in its forward direction to partly release the clutch for return movement toward engaged position in the manner referred to, the pedal assumes its normal position contacting with but not depressing the accelerator pedal, and holding the button 89 sufficiently depressed to prevent the spring 91 from entirely taking up the play between the wire 57 and its guide 56, and accordingly the position of the control pedal referred to may be reached merely by releasing the pedal. When it is desired to cause the vehicle to move forwardly, the control pedal may be slowly pressed forwardly, which action depresses the accelerator pedal to effect an increased engine speed, and such movement of the control pedal permits the spring 91 to gradually take up the play between the parts referred to and move the valve head 60 to a point where it partially uncovers the bleed port 82, and thus slowly admitting air into the upper differential pressure chamber.

Under such conditions, the clutch elements will be slowly brought into engagement as the engine speed is accelerated, thus causing the speed of the vehicle to pick up smoothly without any "grabbing" of the clutch or stalling of the vehicle engine. It is necessary for such slow clutch engagement to take place, however, only when the vehicle is in low gear and starting from a standstill. Accordingly after the vehicle has picked up sufficient momentum, the gear shift may be moved into second gear and the clutch engaged without the necessity of causing slow engagement of the clutch elements. When it is desired to move into second gear, the control pedal is moved in the reverse direction throughout its limit of movement to release the accelerator pedal and then depress the button 89, whereupon the lever 22 may be shifted into second gear and the control pedal moved forwardly to promptly engage the clutch completely and substantially simultaneously depress the accelerator pedal 20. This operation obviously is repeated when going into high gear, it being unnecessary to accomplish a slow engaging of the clutch elements.

The device obviously permits complete controlled operation of both the accelerator pedal and the clutch by the use of one foot, without the necessity of the operator removing his foot from the control pedal, and accordingly the operator may, if he so desires, operate the brake pedal of the vehicle with his left foot. Accordingly it wllll be obvious that both of the operator's feet may be left in the same positions at all times, thus eliminating the usual necessity of having to remove the right foot from the accelerator to operate the brake. Moreover, it will be apparent that the present apparatus provides completely controlled "free wheeling" which is not automatic, and which may or may not be used, in accordance with the operator's desires, with only the necessity that the right foot of the operator be employed for tilting the control pedal.

It will be noted that the valve mechanism is distinguished in its operation from the valve mechanisms of my prior applications above referred to. For example, the valve mechanism described in my copending application Serial No. 487,319 provides a bleed port which is arranged above the main port which permits air to move relatively freely into the upper pressure chamber. With such construction while completely practicable in operation, it was impossible to completely arrest movement of the clutch to engaged position when desired, and accordingly the present construction permits more accurate control and greater smoothness in operation by the placing of the bleed port wholly beneath the port 78 so that the movement of the parts may be completely arrested. Moreover, the present construction eliminates the provision of the springs associated with the auxiliary valve disclosed in my copending application just referred to, it having been discovered that great accuracy of operation is obtainable by substantially directly connecting the rod of the auxiliary valve to the arm 34.

Moreover, it was found that the operation of the apparatus was apt to be affected by occasional sudden drops in the vacuum of the intake manifold, that is, by sudden increases in pressure therein, and I have found that the provision of the check or flap valve overcomes this difficulty. With the provision of this valve, sudden increases in pressure in the intake manifold prevent similar increases in pressure in the upper differential pressure chamber by the immediate closing of the flap valve, thus preventing the operation of the device from being affected.

The operation of the form of the device shown in Figures 5 and 6 is identical with that previously described and need not be referred to in detail. Rocking movement of the lever 99 is transmitted to the valve stem 96 by engagement between the cam 102 and the roller 97. Such movement of the valve stem operates the valve in exact accordance with the previously described operation.

As in the preceding case, the control pedal 105 is freely movable to depress the accelerator pedal to any desired position, and when the control pedal is released, the accelerator pedal will move to its normal position, but no movement will be transmitted to the lever 99 inasmuch as the pin 109 will be arranged in the upper portion of the slot 110. In other words, it requires a definite reverse movement of the control pedal to bring the pin 109 against the bottom of the slot 110 before the valve mechanism will be operated. On the other hand, when the control pedal is moved forwardly to release the valve mechanism, the lost motion between the pin and slot referred to causes the control pedal to reach normal position in contact with the accelerator pedal at the point where the valve mechanism is in checked position whereby further movement of the control pedal will be necessary to completely engage the clutch, and such movement depresses the accelerator pedal to accelerate the speed of the engine. Accordingly it will be apparent that the modified form of the device operates in exactly the same manner as the form of the device previously described.

Where the term "normal position" occurs in the following claims, this expression is intended to indicate that position to which the part referred to will return in the absence of any specially applied force or any specific force tending to prevent movement of the part in question. For example, a specially applied force will move the valve 58 upwardly, and the force of the throttle spring will prevent the complete releasing of the valve for movement to its lowermost position. In the absence of the action of the accelerator spring, however, the valve 58 will move to its lowermost position shown in Figure 3, and such position has been termed the "normal position" of the valve 58. Similarly, in the absence of a specially applied force, the treadle 105 will assume a position wherein the throttle is in idling position with the upper end of the treadle 105 in contact with the button 20, and such position of the treadle 105 is termed the "normal position".

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a differential pressure power device operatively connected to a motor vehicle clutch, a manually operable valve, and a valve connected to the power device, said manually operable valve being movable from normal to operative position to connect the power device to a source of differential pressure to disengage the clutch and being movable to an intermediate position for disconnecting the power device from the source of differential pressure and connecting it to the atmosphere, said second named valve being operative substantially at the point of initial engagement of the clutch elements for closing communication between the power device and the atmosphere for stopping the clutch elements in such position, said first named valve being operable from such intermediate position toward normal position to establish relatively slow communication between the power device and the atmosphere independently of said second named valve.

2. Apparatus of the character described comprising a differential pressure power device operatively connected to a motor vehicle clutch, a manually operable valve, a valve housing having a chamber in which said valve operates and a valve guide, an auxiliary valve operable in said guide, and means connecting said auxiliary valve to a movable part of said power device, said manually operable valve being movable from normal to operative position to connect the power device to a source of differential pressure to disengage the clutch, said valve housing having an atmospheric port adapted to be uncovered when said manually operable valve is moved from operative position to an intermediate position with the power device disconnected from the source of differential pressure, said auxiliary valve being movable to close said port substantially at the point of initial engagement of the clutch elements whereby the latter will be stopped in such position when the manually operable valve is in such intermediate position, said manually operable valve being movable from said intermediate position toward normal position to afford slow communication between the power device and the atmosphere independently of said auxiliary valve.

3. Apparatus constructed in accordance with claim 2 wherein said valve housing is provided with a bleed opening adapted to be uncovered by said manually operable valve after the latter is moved from its intermediate position toward normal position to afford said slow communication between the power device and the atmosphere.

4. Apparatus constructed in accordance with claim 2 wherein said power device is provided with an operating shaft, the means connecting said auxiliary valve to a movable part of said power device comprising a stem carried by said auxiliary valve, and an arm carried by said shaft and connected to said stem.

5. A motor vehicle control apparatus comprising a differential pressure power device operatively connected to the motor vehicle clutch, a valved control means for said power device, an operating element, lost motion means connecting said operating element to said control means, and a control pedal arranged adjacent said operating element and the accelerator pedal of the vehicle, said control pedal being operative from an intermediate normal position through one range of movement to operate the accelerator pedal throughout its range of movement without affecting said control means, and being movable from said normal position through a second range of movement for actuating said operating element to render said power device operative for disengaging the clutch, said lost motion means being operative to cause movement of said control pedal past its normal position from its second range of movement to effect partial operation of the accelerator pedal before said operating element will actuate the control means to permit complete engagement of the operating elements of the clutch.

6. Apparatus constructed in accordance with claim 5 provided with means operated by said power device when said control pedal is moved to normal position from its second range of movement for arresting movement of the clutch elements substantially at their point of initial engagement.

7. Apparatus constructed in accordance with claim 5 wherein said control pedal is pivoted intermediate its ends between said operating element and the accelerator pedal whereby the control pedal swings in opposite directions from its normal position to operate the accelerator pedal and said operating element.

8. Apparatus of the character described comprising a power device operatively connected to a motor vehicle clutch, a control device for said power device movable in one direction for effecting actuation of the power device to disengage the clutch and movable in the opposite direction for releasing the clutch for return movement toward engaged position, means operative when the elements of the clutch reach an intermediate position substantially at the point of initial engagement for stopping the movement of such elements, and means operative for releasing the clutch elements for movement to operative position after they have been stopped in such intermediate position.

9. Apparatus of the character described comprising a power device operatively connected to a motor vehicle clutch, a control device for said power device movable in one direction for effecting actuation of the power device to disengage the clutch and movable in the opposite direction for releasing the clutch for return movement toward engaged position, means operative when the elements of the clutch reach an intermediate position substantially at the point of initial engagement for stopping the movement of such elements, and means operative for releasing the clutch elements for movement to operative position after they have been stopped in such intermediate position, said last named means being operative for retarding the rate of movement of the clutch elements into engagement with each other.

10. Apparatus of the character described comprising a differential pressure power device operatively connected to a motor vehicle clutch, a valve device movable in one direction for connecting the power device to a source of differential pressure and movable in the opposite direction for disconnecting the power device from the source of differential pressure and connecting it to the atmosphere, means operative when the clutch elements reach an intermediate position substantially at the point of initial engagement for rendering the valve device ineffective for connecting the power device to the atmosphere whereby movement of the clutch elements will be stopped, and means operative for reestablishing pressure equalization in said power device to permit the clutch elements to move into engagement with each other after they have been stopped in such intermediate position.

11. Apparatus of the character described comprising a differential pressure power device operatively connected to a motor vehicle clutch, a valve device movable in one direction for connecting the power device to a source of differential pressure and movable in the opposite direction for disconnecting the power device from the source of differential pressure and connecting it to the atmosphere, means operative when the clutch elements reach an intermediate position substantially at the point of initial engagement for rendering the valve device ineffective for connecting the power device to the atmosphere whereby movement of the clutch elements will be stopped, means operative for reestablishing pressure equalization in said power device to permit the clutch elements to move into engagement with each other after they have been stopped in such intermediate position, and means for controlling the rate of movement of the clutch elements into engagement with each other.

12. Apparatus of the character described comprising a power device operatively connected to a motor vehicle clutch, a control device for said power device movable in one direction for effecting actuation of the power device to disengage the clutch and movable in the opposite direction for releasing the clutch for return movement toward engaged position, means operative when the elements of the clutch reach an intermediate position substantially at the point of initial engagement for stopping the movement of such elements, means for releasing the clutch elements for movement to operative position after they have been stopped in such intermediate position, an accelerator pedal connected to the throttle of the motor vehicle engine, and means operative upon depression of the accelerator pedal from idling position for rendering said last named means operative.

13. Apparatus of the character described comprising a differential pressure power device operatively connected to a motor vehicle clutch, a valve device movable in one direction for connecting the power device to a source of differential pressure and movable in the opposite direction for disconnecting the power device from the source of differential pressure and connecting it to the atmosphere, means operative when the clutch elements reach an intermediate position substantially at the point of initial engagement for rendering the valve device ineffective for connecting the power device to the atmosphere whereby movement of the clutch elements will be stopped, means for reestablishing pressure equalization in said power device to permit the clutch elements to move into engagement with each other after they have been stopped in such intermediate position, an accelerator pedal connected to the throttle of the motor vehicle engine, and means operative upon depression of the accelerator pedal from idling position for rendering said last named means operative.

14. Apparatus of the character described comprising a power device operatively connected to a motor vehicle clutch, and a control device for said power device having a member movable in one direction from normal position for effecting actuation of the power device to disengage the clutch, said control device including a second member operable when said first named member is moved back to an intermediate position toward normal position for permitting movement of the operating elements of the clutch approximately to the point of initial engagement and for stopping the clutch elements in such position, the first named member of said control device being further movable back toward normal position to effect relatively gradual engagement of the clutch elements.

15. Apparatus of the character described comprising a power device operatively connected to a motor vehicle clutch, and a control device for said power device having a member movable from normal position to an operative position for effecting actuation of the power device to effect disengagement of the clutch, said control device being movable directly from operative position back to normal position to effect relatively rapid engagement of the operating elements of the clutch, said control device including a second member operable when said first named member is moved to an intermediate position toward normal position to permit movement of the operating elements of the clutch substantially to the point of initial engagement and for stopping the clutch elements in such position.

16. Apparatus constructed in accordance with claim 15 wherein the first named member of said control device is movable from said intermediate position toward normal position for effecting relatively slow engagement between the operating elements of the clutch.

17. Apparatus of the character described comprising a differential pressure power device operatively connected to a motor vehicle clutch, and valve mechanism for controlling said power device and including a valve movable from normal to operative position for connecting the power device to a source of differential pressure, said valve mechanism including a second valve operable when said first named valve is moved from said operative position to an intermediate position for disconnecting the power device from the source of differential pressure and connecting it to the atmosphere and operative for disconnecting the power device from the atmosphere when the clutch elements reach an intermediate position substantially at the point of initial engagement whereby movement of the clutch elements is stopped in such position, said first named valve being movable from its intermediate position toward normal position for slowly establishing pressure equalization in said power device.

18. A motor vehicle control apparatus comprising a power device operatively connected to the motor vehicle clutch, an accelerator pedal connected to the throttle of the vehicle engine, control means for said power device, an operating element connected to said control means and located adjacent the accelerator pedal of the vehicle, and a control pedal arranged adjacent the accelerator pedal and said operating element, said control pedal being movable to transmit movement to the accelerator pedal throughout the range of movement of the latter without affecting said control means, and being movable through a different range of movement for actuating said operating element to render said power device operative for disengaging the clutch, said control pedal being movable back through said different range of movement to effect the release of the clutch elements for return movement toward engaged position and being adapted to partially effect operation of the accelerator pedal before the clutch elements become completely engaged.

19. A motor vehicle control apparatus comprising a power device operatively connected to the motor vehicle clutch, an accelerator pedal connected to the throttle of the vehicle engine, control means for said power device, an operating element connected to said control means and located adjacent the accelerator pedal of the vehicle, and a control pedal arranged adjacent the accelerator pedal and said operating element, said control pedal being movable to transmit movement to the accelerator pedal throughout the range of movement of the latter without affecting said control means, and being movable through a different range of movement for actuating said operating element to render said power device operative for disengaging the clutch, said control pedal being adapted to assume a normal position between said ranges of movement and being adapted when moved to such position from the accelerator operating range to leave said accelerator and said operating element inoperative, said control pedal being adapted when moved to normal position from the clutch operating range to hold the clutch in a position with the clutch elements substantially at the point of initial engagement with the accelerator pedal inoperative, whereby movement of the control pedal into the accelerator operating range is necessary before the operating elements of the clutch become completely engaged.

20. Apparatus of the character described comprising a power device operatively connected to a motor vehicle clutch, a control device for effecting actuation of said power device to disengage the clutch and to release the clutch elements for return movement toward engaged position, means operative when the clutch elements reach an intermediate position for stopping the movement of the clutch elements, and means operative for releasing the clutch elements for movement to engaged position after they have been stopped in such intermediate position.

21. Apparatus of the character described comprising a power device operatively connected to a motor vehicle clutch, a control device for effecting actuation of the power device to disengage the clutch and to release the clutch elements for return movement toward engaged position, means operative when the clutch elements reach an intermediate position for stopping the movement of the clutch elements, and means operative for releasing the clutch elements for movement to operative position after they have been stopped in such intermediate position, said last named means being operative for retarding the rate of movement of the clutch elements into engagement with each other.

22. Apparatus of the character described comprising a power device operatively connected to a motor vehicle clutch, a control device for effecting actuation of said power device to disengage the clutch and to release the clutch for return movement toward engaged position, means operative when the elements of the clutch reach an intermediate position for stopping the movement of such elements, means for releasing the clutch elements for movement to engaged position after they have been stopped in such intermediate position, an accelerator pedal connected to the throttle of the motor vehicle engine, and means operative upon depression of the accelerator pedal from idling position for rendering said last named means operative.

23. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be stopped, and means operative for reestablishing pressure equalization in said power device to permit the clutch elements to move into engagement with each other after they have been stopped in such intermediate position.

24. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be stopped, means operative for reestablishing pressure equalization in said power device to permit the clutch elements to move into engagement with each other after they have been stopped in such intermediate position, and means for controlling the rate of movement of the clutch elements into engagement with each other.

25. Apparatus of the character described comprising a differential pressure power device operatively connected to a motor vehicle clutch, a valve device for connecting the power device to a source of differential pressure and for disconnecting the power device from the source of differential pressure and connecting it to the atmosphere, means operative when the clutch elements reach an intermediate position for rendering the valve device ineffective for connecting the power device to the atmosphere whereby movement of the clutch elements will be stopped, means for reestablishing pressure equalization in said power device to permit the clutch elements to move into engagement with each other after they have been stopped in such intermediate position, an accelerator pedal connected to the throttle of the motor vehicle engine, and means operative upon depression of the accelerator pedal from idling position for rendering said last named means operative.

EDWARD G. HILL.